United States Patent
Song

(10) Patent No.: US 10,837,303 B2
(45) Date of Patent: Nov. 17, 2020

(54) TIP SEALING STRUCTURE FOR BLADE, ROTOR INCLUDING SAME, AND GAS TURBINE INCLUDING SAME

(71) Applicant: DOOSAN HEAVY INDUSTRIES & CONSTRUCTION CO., LTD., Changwon-si (KR)

(72) Inventor: Jin Woo Song, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 52 days.

(21) Appl. No.: 16/101,522

(22) Filed: Aug. 13, 2018

(65) Prior Publication Data

US 2019/0093500 A1    Mar. 28, 2019

(30) Foreign Application Priority Data

Sep. 27, 2017    (KR) .......................... 10-2017-0124827

(51) Int. Cl.
*F01D 11/16* (2006.01)
*F01D 5/20* (2006.01)
*F01D 5/22* (2006.01)

(52) U.S. Cl.
CPC ................ *F01D 11/16* (2013.01); *F01D 5/20* (2013.01); *F01D 5/225* (2013.01);
(Continued)

(58) Field of Classification Search
CPC . F01D 11/16; F01D 5/20; F01D 5/225; F05D 2220/32; F05D 2240/307; F05D 2240/56
See application file for complete search history.

(56) References Cited

U.S. PATENT DOCUMENTS

| 2003/0080510 A1* | 5/2003 | Dinc | F16J 15/442 |
| | | | 277/355 |
| 2005/0008481 A1* | 1/2005 | Nottin | F01D 5/20 |
| | | | 415/173.1 |

(Continued)

FOREIGN PATENT DOCUMENTS

| JP | 11013404 A | * | 1/1999 | .............. F01D 11/08 |
| JP | H11-013404 A | | 1/1999 | |

(Continued)

OTHER PUBLICATIONS

A Korean Office Action dated Sep. 5, 2018 in connection with Korean Patent Application No. 10-2017-0124827 which corresponds to the above-referenced U.S. application.

*Primary Examiner* — Nathaniel E Wiehe
*Assistant Examiner* — Eric A Lange
(74) *Attorney, Agent, or Firm* — Invenstone Patent, LLC

(57) ABSTRACT

A tip sealing structure for a blade includes a casing having an inner circumferential surface facing the blade; a blocking groove formed in the inner circumferential surface of the casing; and a movable seal provided on a tip of the blade and configured to move in a depth direction of the blocking groove. Since the seal is configured to move into the blocking groove, tighter sealing at the tip of the blade can be accomplished. A seal bracket of the moveable seal encloses a movement space open at one end and includes a seal stop formed at the open end. A brush body including top and bottom crossbars is disposed partially within the seal bracket, such that movement of the moveable seal is limited by the bottom crossbar being stopped by the seal stop. A first brush seal is mounted on the brush body and positioned in the blocking groove.

16 Claims, 9 Drawing Sheets

(52) U.S. Cl.
CPC .... *F05D 2220/32* (2013.01); *F05D 2240/307* (2013.01); *F05D 2240/56* (2013.01)

(56) References Cited

U.S. PATENT DOCUMENTS

2013/0170962 A1* 7/2013 Chouhan ............... F01D 5/225
  415/173.1
2016/0010560 A1* 1/2016 Dierksmeier ........... F01D 5/085
  60/772

FOREIGN PATENT DOCUMENTS

| JP | 2017036799 A | 2/2017 |
| JP | 2017125492 A | 7/2017 |
| WO | 2014091599 A1 | 6/2014 |

* cited by examiner

【FIG 1】
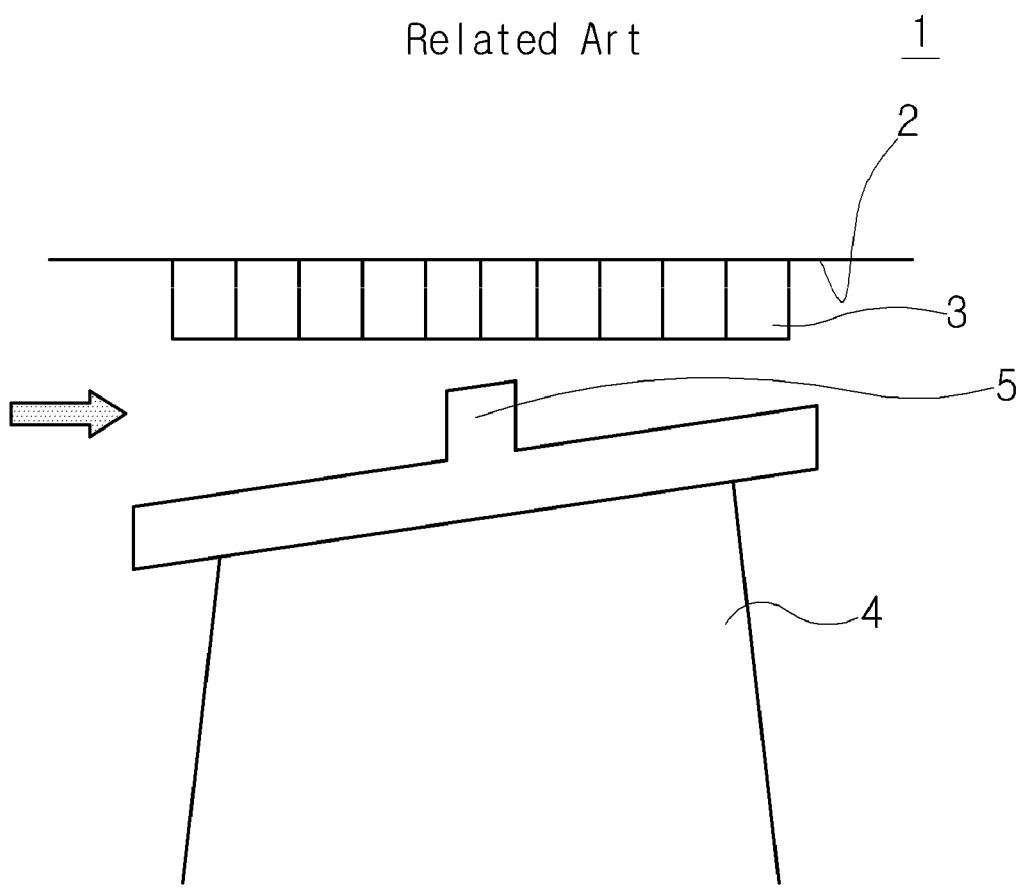

[FIG 2]
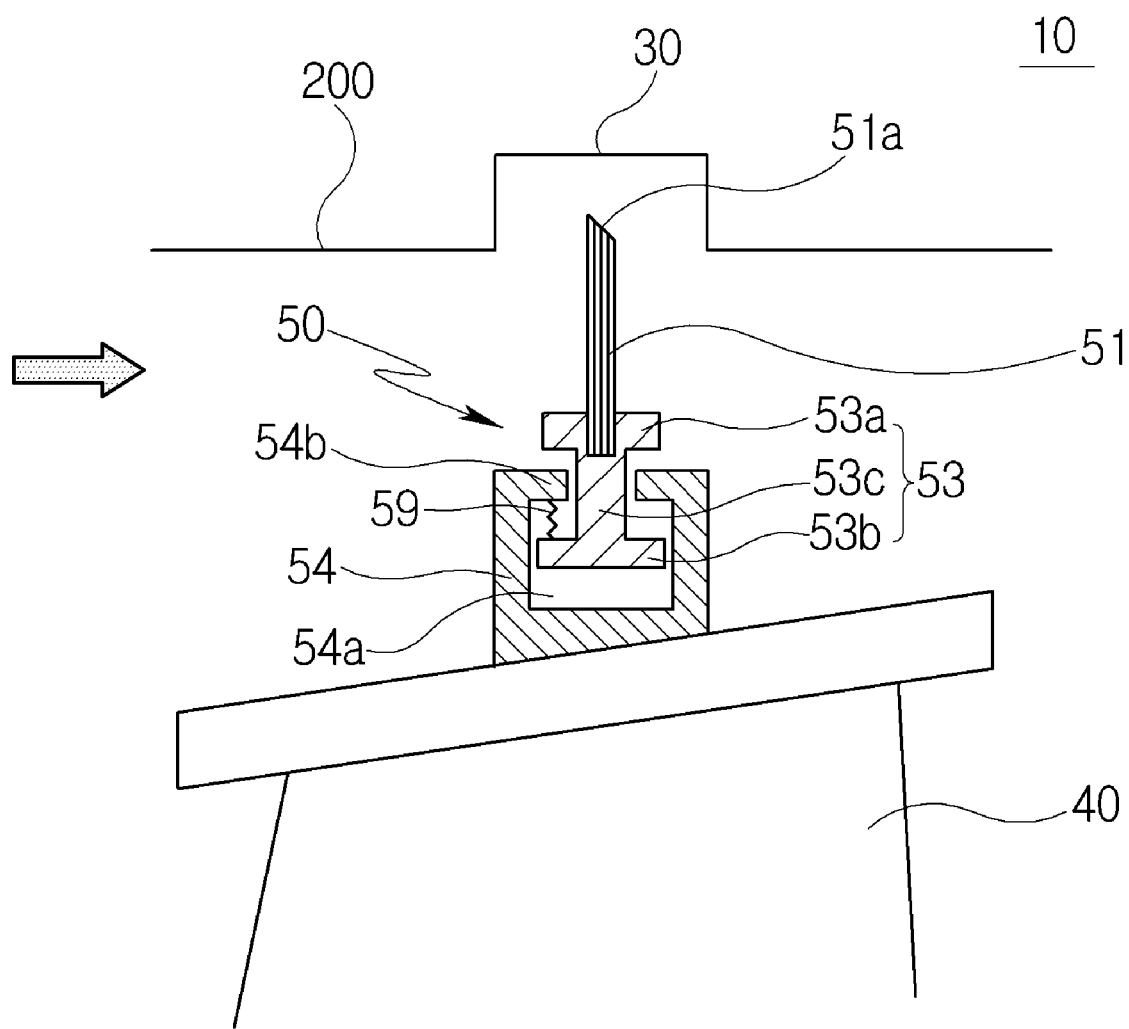

[FIG 3]
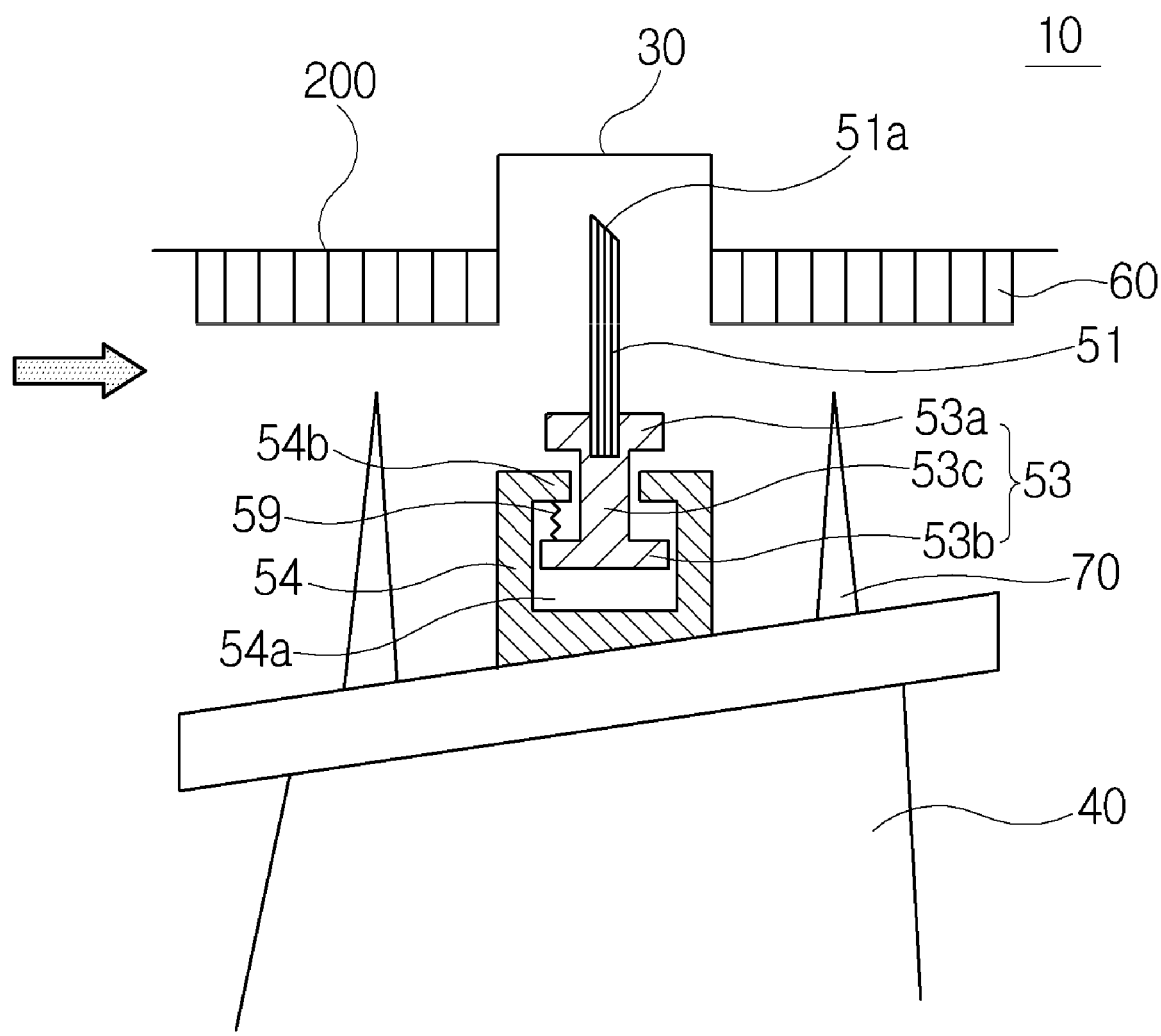

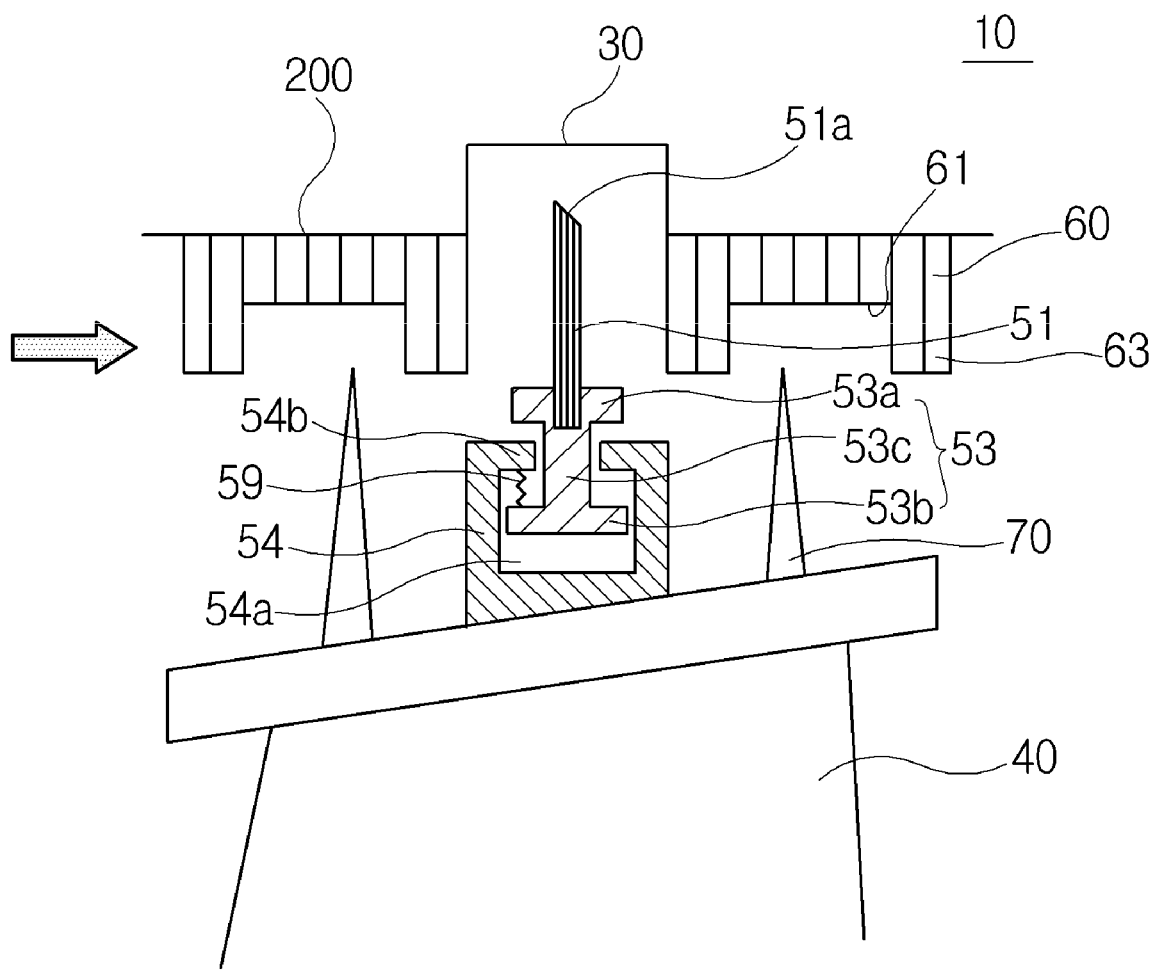
[FIG 4]

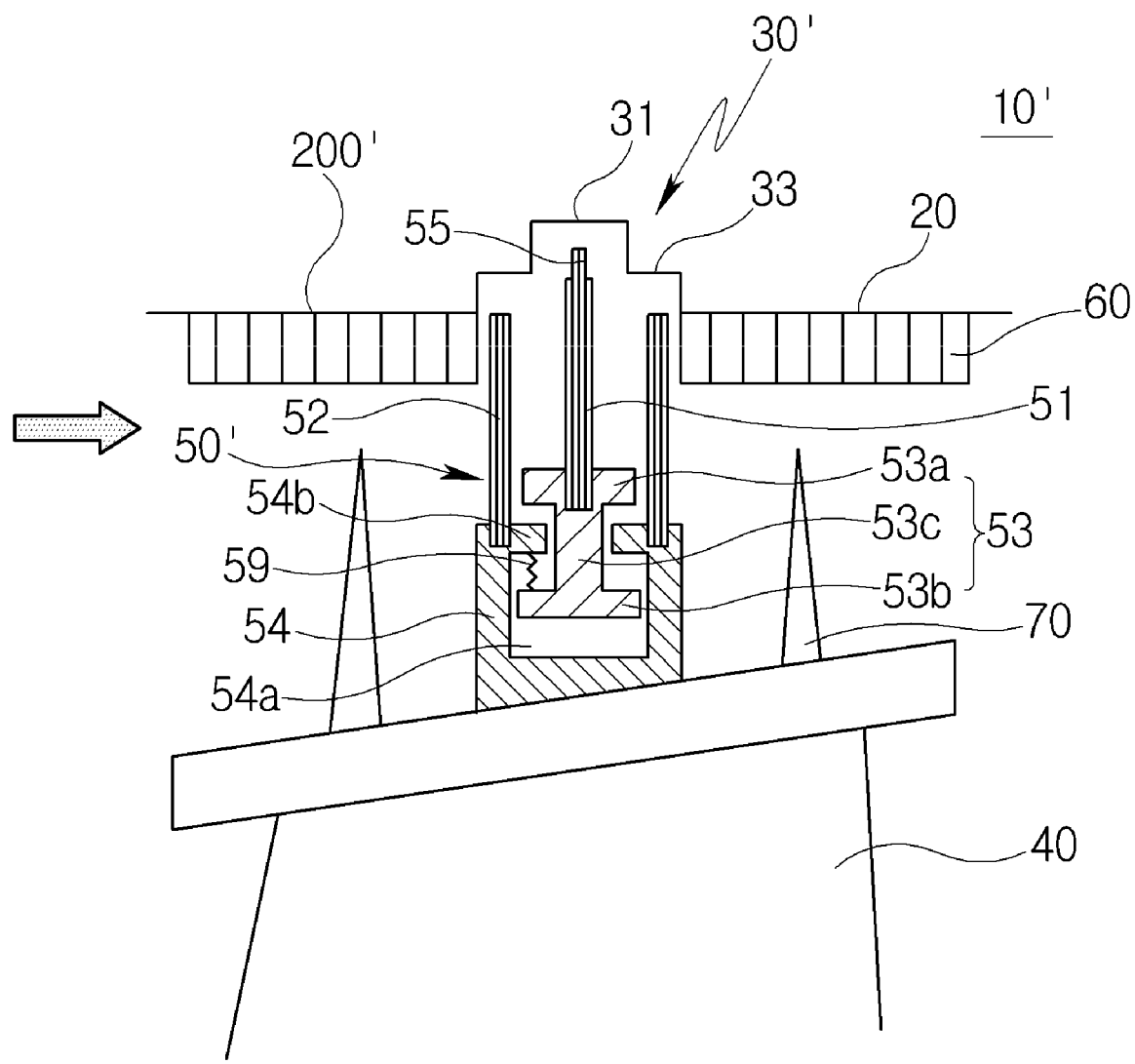
[FIG 5]

[FIG 6]
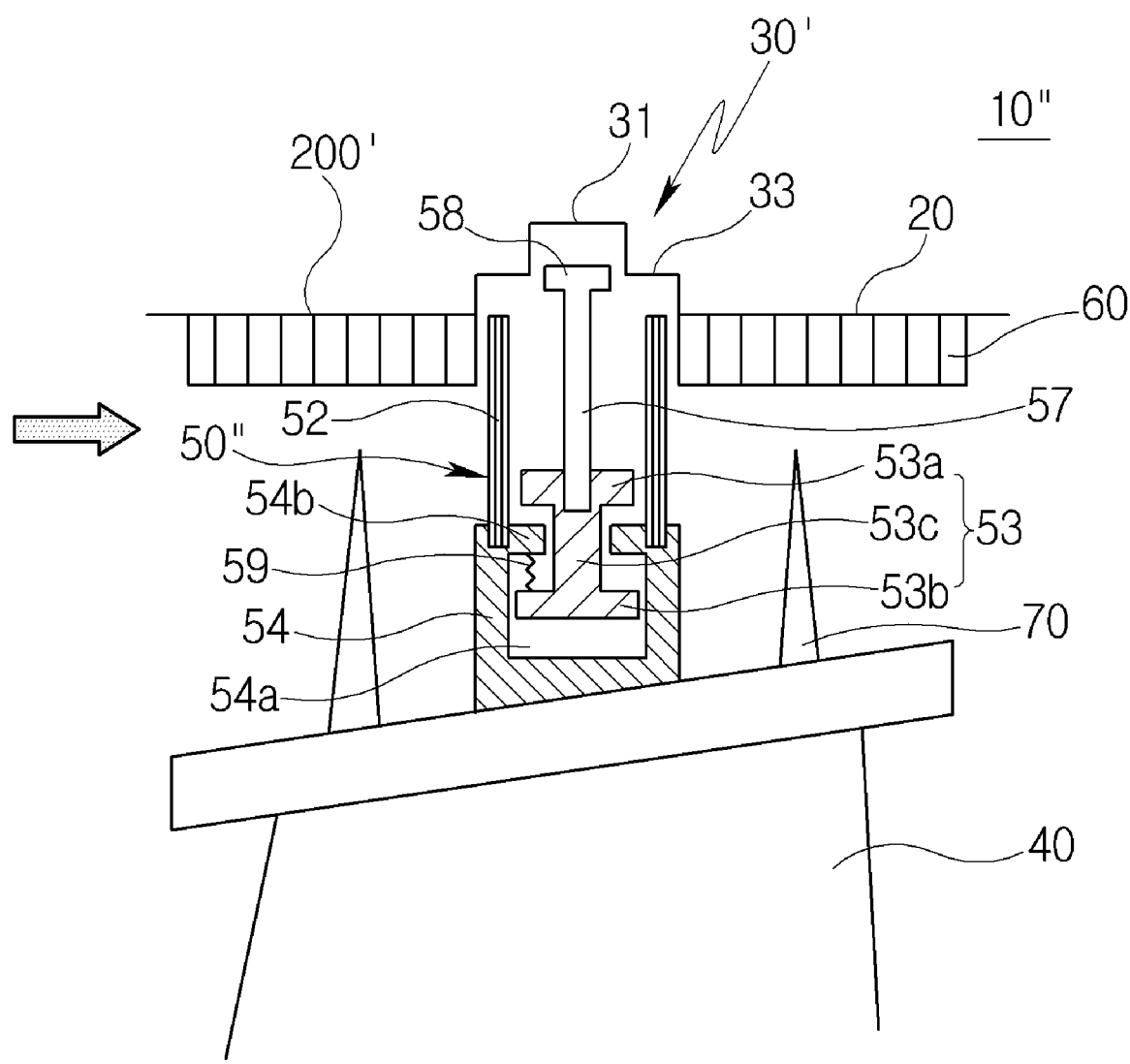

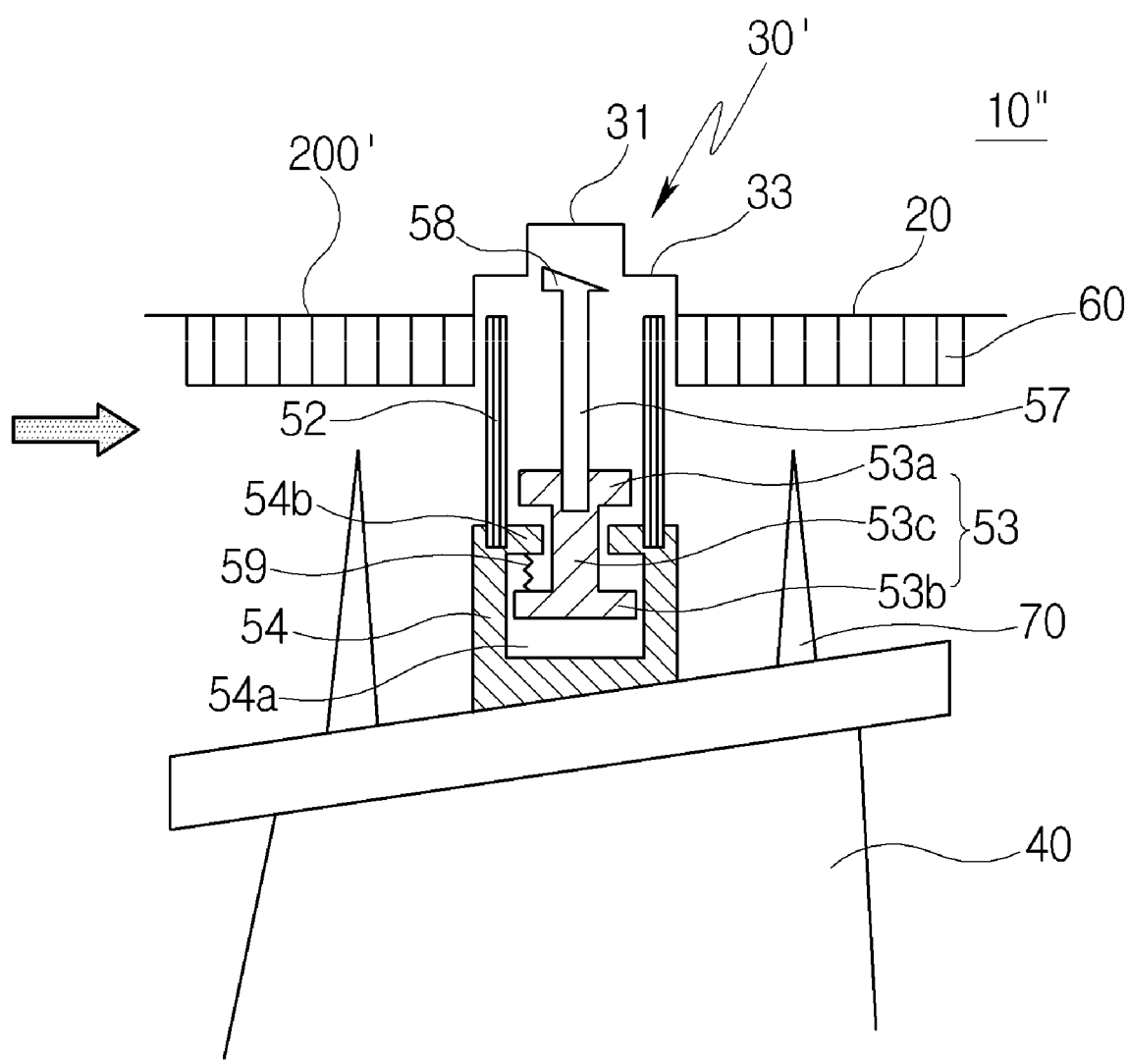
[FIG 7]

【FIG 8】
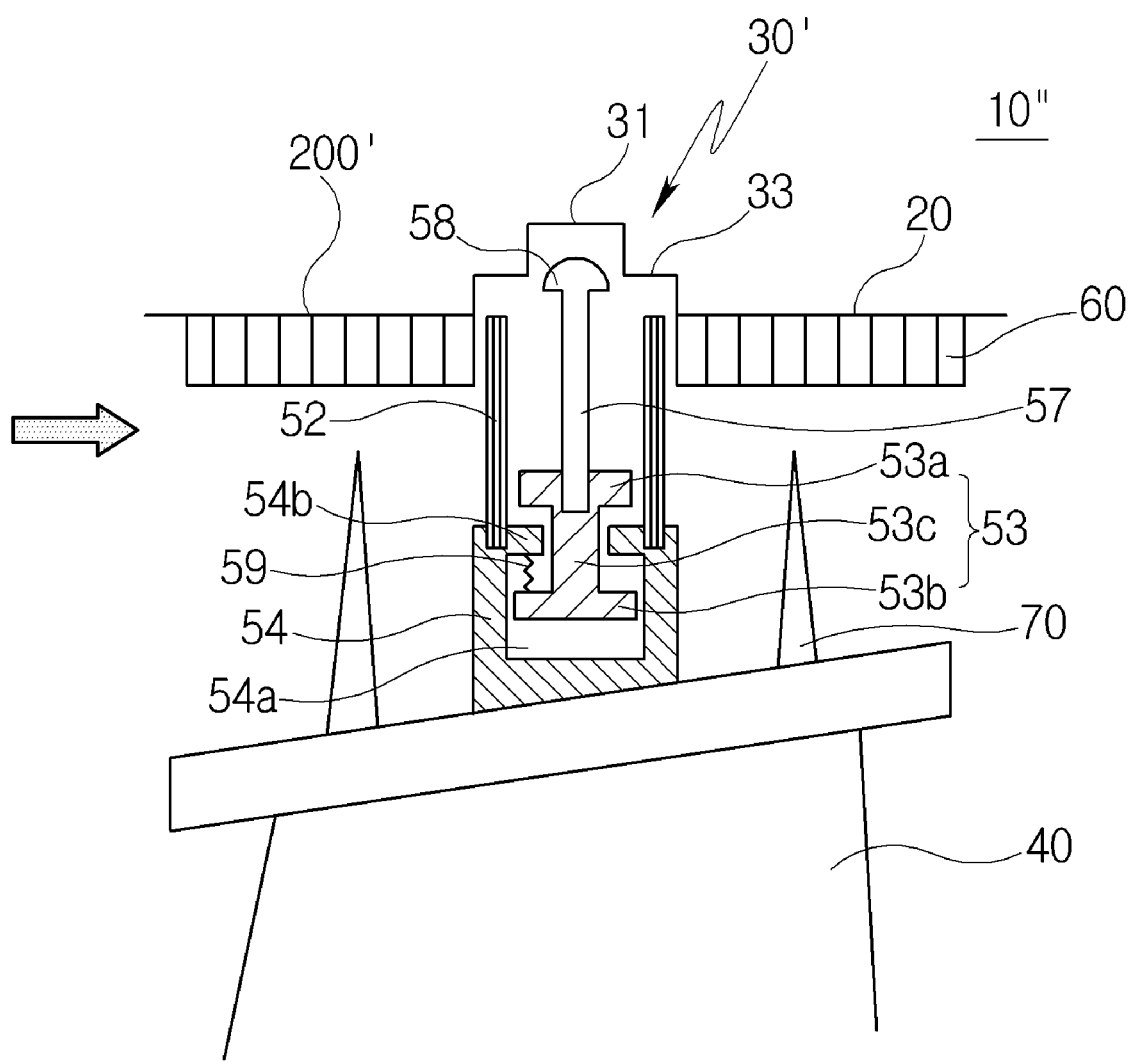

[FIG 9]
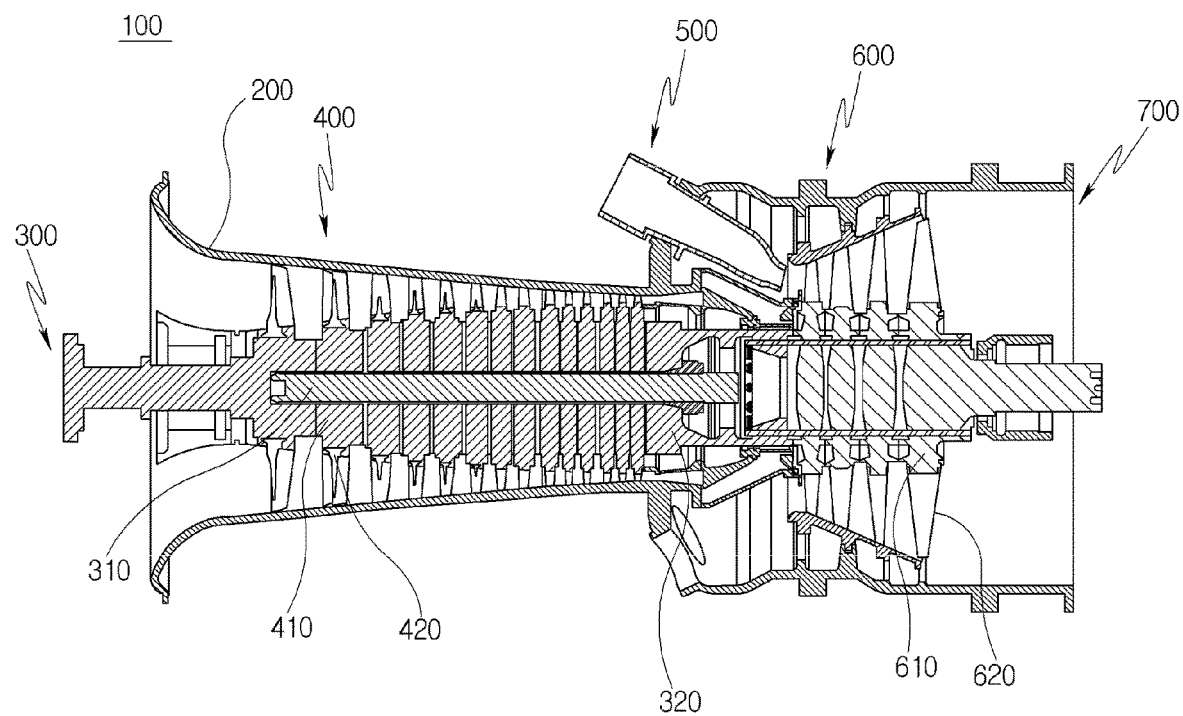

TIP SEALING STRUCTURE FOR BLADE, ROTOR INCLUDING SAME, AND GAS TURBINE INCLUDING SAME

CROSS REFERENCE TO RELATED APPLICATIONS

This application claims the benefit of Korean Patent Application No. 10-2017-0124827, filed on Sep. 27, 2017, in the Korean Intellectual Property Office, the disclosure of which is incorporated herein in its entirety by reference.

BACKGROUND OF THE DISCLOSURE

1. Field of the Disclosure

The present invention relates to a tip sealing structure for a blade, and more particularly, to a tip sealing structure capable of providing a hermetic seal at the tip of a blade.

2. Description of the Background Art

A turbine is a rotary mechanical device that rotates by an impulse force of or a reaction force to a flow of compressible fluid such as gas. Turbines may be categorized into steam turbines using steam as the compressible fluid and gas turbines using hot combustion gas as the compressible fluid.

A gas turbine is mainly composed of a compressor section, a combustor section, and a turbine section. The compressor section includes a compressor casing that is provided with an air inlet through which air is introduced and multiple compressor vanes and multiple compressor blades that are arranged to alternate with each other in the compressor casing.

The combustor section mixes fuel with compressed air generated by the compressor section and ignites the fuel-air mixture with a burner to produce high-temperature high-pressure combustion gas.

The turbine section includes a turbine casing and multiple turbine vanes and multiple turbine blades that are arranged to alternate with each other in the turbine casing.

A rotor is arranged to extend through the centers of the compressor section, the combustor section, the turbine section, and an exhaust chamber.

The rotor is rotatably supported by bearings at respective ends thereof. The rotor combines with multiple disks such that the multiple disks are mounted on the rotor, and multiple blades are attached to each of the multiple disks. An end of the rotor, which is disposed on the exhaust chamber side, is connected to a drive shaft.

This gas turbine does not include a reciprocating mechanism such as a piston, which is present in a typical four-stroke engine. Therefore, it has no mutual frictional parts such as a piston-cylinder part, thereby consuming an extremely small amount of lubricating oil and reducing the operational movement range, which results in high speed operability.

The operation of a gas turbine will be briefly described. Air is first compressed by a compressor and then mixed with fuel. Then, the fuel-air mixture is burned to produce combustion gas which is then ejected toward a turbine. The ejected combustion gas causes rotary force while passing between turbine vanes and between turbine blades, so that the rotor of the turbine is rotated by the rotary force.

Regarding the operation of a gas turbine, a measure to prevent leakage of a working fluid is an important technology. FIG. 1 illustrates a contemporary tip sealing structure 1 for a blade for preventing leakage of a working fluid at the tip of a blade.

Referring to FIG. 1, the contemporary tip sealing structure 1 includes a honeycomb seal 3 provided on the inner surface of a stationary part 2 and a labyrinth seal 5 provided at the tip of a blade 4 and disposed to face the stationary part 2. The tip sealing structure 1 prevents a working fluid from leaking through a clearance between the inner surface of the stationary part 2 and the tip of the blade 4.

However, it should be appreciated that flow loss at the tip of the blade 4 actually occurs during rotation of the blade 4.

SUMMARY OF THE DISCLOSURE

The present invention has been made to solve the problems occurring in the related art and is thus intended to provide a tip sealing structure for a blade, the tip sealing structure including a movable brush seal that provides tighter sealing.

In order to accomplish the objective of the present invention, a first aspect of the present invention provides a tip sealing structure for a blade. The tip sealing structure may include a casing having an inner circumferential surface facing the blade; a blocking groove formed in the inner circumferential surface of the casing; and a movable seal provided on a tip of the blade and configured to move in a depth direction of the blocking groove.

The movable seal may include a seal bracket disposed on the tip of the blade, the seal bracket enclosing a movement space that is open at one end and including a seal stop formed at the open end of the movement space; and a brush body including top and bottom crossbars and an upright extending between the top and bottom crossbars, the brush body disposed partially within the seal bracket and configured such that movement of the moveable seal is limited by the bottom crossbar being stopped by the seal stop of the seal bracket when the movable seal moves in the depth direction of the blocking groove.

The moveable seal may further include an elastic body disposed inside the movement space to bias the brush body toward the blade. The tip sealing structure may further include a first seal mounted on the inner circumferential surface of the casing and disposed near the blocking groove; and a second seal mounted on the tip of the blade to face the first seal. The first seal may include protrusions and a recess formed between the protrusions, and the second seal is disposed to face the recess of the first seal.

The moveable seal may further include a first brush seal mounted on the brush body and positioned in the blocking groove. The first brush seal may have a distal end disposed in the blocking groove, the distal end having an incline that slopes down in a direction in which the working fluid flows.

The movable seal may further include a second brush seal disposed at one side of the first brush seal.

The blocking groove may include a central groove having a depth accommodating a length and movement of the first brush seal; and a peripheral groove provided at one side of the central groove, the peripheral groove having a depth accommodating a length and movement of the second brush seal.

The movable seal may further include a central brush seal provided at a center portion of the first brush seal.

The second brush seal may be shorter than the first brush seal.

The movable seal may further include a metallic sealing beam mounted on the brush body and disposed in the blocking groove. The metallic sealing beam may have a distal end provided with a roof beam. The roof beam may be configured to have one of a rectangular, triangular, and semicircular cross-section.

A second aspect of the present invention provides a rotor including a rotor disk having an outer circumferential surface; and a bucket including a blade provided with the above tip sealing structure.

A third aspect of the present invention provides a gas turbine including an outer shell formed of the casing; and the above rotor disposed in the casing.

According to the present invention, a movable brush seal is provided at a tip end of a blade and a labyrinth seal and a honeycomb seal are arranged at respective sides of the tip end of the blade, so as to correspond to each other. With this seal structure, it is possible to improve a sealing ability at the tip end of the blade.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a schematic diagram of a tip sealing structure for a blade according to a related art;

FIG. 2 is a schematic diagram of a tip sealing structure for a blade according to a first embodiment;

FIGS. 3 and 4 are schematic diagrams of a tip sealing structure for a blade, respectively illustrating modifications to the first embodiment of FIG. 2;

FIG. 5 is a schematic diagram of a tip sealing structure for a blade according to a second embodiment;

FIG. 6 is a schematic diagram of a tip sealing structure for a blade according to a third embodiment;

FIGS. 7 and 8 are schematic diagrams of a tip sealing structure for a blade, respectively illustrating modifications to the third embodiment of FIG. 6; and FIG. 9 is a cross-sectional view of a gas turbine according to one embodiment of the present invention.

DETAILED DESCRIPTION OF THE DISCLOSURE

Hereinafter, preferred embodiments of a tip sealing structure for a blade, according to the present invention, will be described with reference to the accompanying drawings.

Prior to describing the preferred embodiments of the present invention, the overall construction of a gas turbine will be briefly described with reference to the accompanying drawings.

Referring to FIG. 9, a gas turbine 100 includes a casing 200 serving as an outer shell, a compressor section 400 compressing air to produce compressed air, a combustor section 500 burning a fuel-air mixture to produce combustion gas, a turbine section 600 driving a generator so that electric power can be generated by the generator by using the combustion gas, a diffuser 700 discharging exhaust gas, and a rotor 300 connects the compressor section 400 and the turbine section 600 to transfer rotary force.

External air flows into the compressor section disposed at an upstream side of the gas turbine and the air then undergoes adiabatic compression in the compressor section in a thermodynamic sense. The compressed air then flows into the combustor section and then mixes with fuel. The air-fuel mixture undergoes constant pressure combustion to generate combustion gas. The combustion gas flows into the turbine section that is a downstream part of the gas turbine.

In terms of a direction in which air flows, the compressor section 400 is disposed at the front side (upstream side) of the casing 200, and the turbine section 600 is disposed at the rear side (downstream side) of the casing 200.

A torque tube 320 for transmitting torque generated by the turbine section 600 to the compressor section 400 is provided between the compressor section 400 and the turbine section 600.

The compressor section 400 is provided with a plurality of (for example, fourteen) compressor rotor disks 410, and the compressor disks 410 are fastened by a tie rod 310 such as not to be separated from each other in the axial direction of the tie rod 310.

The compressor rotor disks 410 are arranged in the axial direction of the gas turbine with the tie rod 310 arranged to extend through the centers of the compressor rotor disks 410. A flange is mounted to protrude, in the axial direction or the rotor, from one surface of each of the compressor rotor disks, and is disposed at a position near the periphery of a corresponding one of the compressor rotor disks. The flanges are rocked in rotation with respect to the adjacent rotor discs.

A plurality of blades 420 (also referred to as buckets) are radially coupled to the outer circumferential surface of the compressor rotor disk 410. Each of the blades 420 has a root member (not illustrated), for example, having a dovetail shape. The root member is inserted into a corresponding slot formed in the outer circumferential surface of the compressor rotor disk 410. In this way, the blades 420 are fastened to the compressor rotor disk 410.

The root member of each blade 420 may be inserted in a tangential direction or an axial direction. Whether to use the tangential entry type or to use the axial entry type may be determined according to the structure of a gas turbine. In some cases, the compressor blade 420 may be fastened to the compressor rotor disk 410 in a different fastening manner from the dovetail fastening.

At this time, multiple vanes (not illustrated, also referred to as nozzles) that are reference positions of relative rotation of the compressor blades 420 are mounted via diaphragms (not illustrated) on the inner circumferential surface of the casing 200 of the compressor section 400.

The tie rod 310 is arranged to pass through the central holes of the plurality of compressor rotor disks 410, in which one end of the tie rod 310 may be coupled the most upstream rotor disk and the other end may be fixed to the torque tube 320.

The configuration of the tie rod 310 may vary according to the type of gas turbine. Therefore, it should be noted that the shape of the tie rod 310 is not limited to the example illustrated in the drawings. For example, a single tie rod 310 may be installed to pass through all of the central holes of the rotor discs. Alternatively, a plurality of tie rods may be arranged in parallel in a circumferential direction, or a complex type using both the single-rod type and the multi-rod type may be used.

Although not illustrated in the drawings, the compressor of the gas turbine may be provided with vanes serving as guide vanes at a downstream position from a diffuser, to control the inflow angle of compressed fluid entering into the combustor such that the actual inflow angle matches with the designed inflow angle. An assembly of the vanes disposed at the downstream from the diffuser is referred to as a deswirler.

The combustor 500 mixes the compressed air with fuel and burns the air-fuel mixture to produce high-temperature high-pressure combustion gas. The combustion process is performed under constant pressure and the temperature of the combustion gas is increased to a critical heat-resistant temperature of the components of the combustor 500 and the turbine section 600.

A plurality of combustors 500 constituting the combustion section of the gas turbine may be arranged in a casing 200 in which a plurality of cells or cans are formed. The combustor 500 includes a burner including a fuel injection nozzle and the like, a liner defining a combustion chamber, and a transition piece serving as a transient member between the combustor 500 and the turbine section 600.

Particularly, the liner defines the combustion chamber in which the fuel injected through the fuel nozzle and the compressed air supplied from the compressor are mixed and burned. The liner encompasses a combustion space (i.e., combustion chamber) in which a fuel and air mixture is combusted, and a flow sleeve also encompasses the combustion chamber and provides an annulus space between itself and the liner. A fuel nozzle assembly is coupled to a front end (i.e., upstream end) of the liner, and a spark igniter plug is installed in the side surface of the combustor.

The transition piece is connected to a rear end (i.e., downstream end) of the liner to deliver the combustion gas, produced in the combustion chamber after the flame is started by the spark igniter plug, to the turbine section 600.

The outer shell of the transition piece is required to be cooled so that it may not be cracked or fractured by the high temperature combustion gas. The cooling of the outer shell of the transition piece is achieved by bleeding a portion of the compressed air supplied from the compressor section 400.

To this end, the transition piece is provided with cooling holes through which the compressed air is injected. The compressed air introduced through the cooling holes cools down the outer shell of the transition piece, and then flows toward the liner.

The air used for cooling the outer shell of the transition piece flows into the annulus space provided between the liner and the flow sleeve. A portion of the compressed air is external introduced into the annulus space through cooling holes formed in the flow sleeve may collide against the outer surface of the liner.

In general, in the turbine section 600, the high-temperature high-pressure combustion gas injected into the combustion section 600 from the combustor 500 expands in the combustion section 600, thereby giving an impulse force to or causing a reaction force of the rotor blades of the turbine section 600. That is, the thermal energy of the combustion gas is converted into mechanical energy.

A portion of the mechanical energy generated is the turbine section 600 is transferred to the compressor section 400 so as to be used as energy required to compress air and the remainder is used as energy required to drive an electric generator to produce electric power.

The turbine section 600 includes a plurality of stators and a plurality of rotors that are alternately arranged. The combustion gas acts on and imparts rotary energy to the rotors, which in turn drive the output shaft to which the generator is connected.

To this end, the turbine section 600 includes a plurality of turbine rotor disks. Each turbine rotor disk 610 has the substantially same shape as the compressor rotor disks 410.

Each turbine rotor disk 610 includes a flange (not illustrated) by which each turbine rotor disk 610 is fastened to the neighboring turbine rotor disk 610. In addition, a plurality of turbine blades 620 (or referred to as buckets) are radially fastened to the turbine rotor disk 610. Each of the turbine blades 620 also may be fastened to the turbine rotor disk in a dovetail coupling manner.

Here, multiple vanes (not illustrated and alternatively referred to as nozzles) that are reference positions of relative rotation of the turbine blades 620 are mounted via diaphragms (not illustrated) on the inner circumferential surface of the casing 200 of the compressor section 600.

In the gas turbine having the structure described above, the intake air is compressed in the compressor section 400, then burned in the combustor 500, then injected into the turbine section 600 to be used to drive an electric generator for generation of electric power, and finally discharged into the atmosphere via the diffuser 700.

Here, the torque tubes 320, the compressor rotor disks 410, the compressor blades 420, the turbine rotor disks 610, the turbine blades 620, the tie rods 310 and the like are rotary elements and collectively called a rotor 300 or a rotating body. The casing 200, the vanes (not illustrated), the diaphragms (not illustrated), and the like may be collectively referred to as a stator, a fixed body, a stationary part, or a stationary member.

The overall structure of one typical gas turbine has been described above. Hereinafter, the present invention applicable to a gas turbine will be described.

First Embodiment

FIG. 2 illustrates a tip sealing structure 10 according to a first embodiment the present invention.

Referring to FIG. 2, the tip sealing structure 10 may include the casing 200, a blocking groove 30, and a movable seal 50.

The blocking groove 30 may be formed in an inner circumferential surface of the casing 200, which may have a substantially cylindrical shape. Thus, the blocking groove 30 may be formed in the circumferential direction of the casing 20 to have a predetermined depth aligned with a perpendicular from the axis of the rotor 300.

The movable seal 50 is disposed at the tip of a blade 40 and is configured to move in the depth direction of the blocking groove 30 and to prevent leakage of the working fluid.

The movable seal 50 may include a seal bracket 54, a brush body 53, a first brush seal 51, and an elastic body 59.

The seal bracket 54 is disposed on the tip of the blade 40 and encloses a movement space (i.e., a cavity) 54a that is open at one end. The seal bracket 54 includes a seal stop 54b formed at the open end of the movement space 54a. The seal bracket 54 is provided for each of the blades 40 mounted on the outer circumferential surface of the rotor disk. Therefore, there are as many seal brackets 54 as the number of the blades 40 arranged in the circumferential direction of the rotor disk.

The brush body 53 includes top and bottom crossbars 53a and 53b and an upright 53c extending between the top and bottom crossbars 53a and 53b. A central recess is formed in a top surface (i.e., outer surface) of the top crossbar 53a, to receive a first brush seal 51 (described later). The brush body 53 is disposed partially within the seal bracket 54, such that the bottom crossbar 53b and one end of the upright 53c are disposed inside the movement space 54a and the top bar 53a and the other end of the upright 53c are disposed outside the movement space 54a, that is, above the seal stop 54b of the seal bracket 54. The opposite ends of each of the top and bottom crossbars 53a and 53b protrude from the upright 53c of the brush body 53, respectively extending in the widthwise direction of the seal bracket 54. In other words, each of the top and bottom crossbars 53a and 53b extend perpendicular to the longitudinal direction of the upright 53c of the brush body 53. When the brush body 53 moves in the depth direction of the blocking groove 30, the top and bottom crossbars 53a and 53b collide with the seal stop 54b and are stopped. Therefore, an outward movement range of the brush body 53 in the depth direction of the seal bracket 54 is restricted due to the seal stop 54b and the bottom crossbar 53b, and thus the brush body 53 does not escape from the movement space 54a of the seal bracket 54.

The upright 53c of the brush body 53 has a predetermined length that may be equal to the depth of the blocking groove 30. The upright 53c of the brush body 53 is configured to be guided in the depth direction of the blocking groove 30 in a state of being installed between opposing edges of the seal stop 54b of the seal bracket 54.

A first brush seal 51 may be mounted on the top surface of the brush body 53, i.e., in the above-described central recess, and extends in the radial direction of the rotor disk. A distal end of the first brush seal 51, which may be disposed inside the blocking groove 30, may have an incline 51a facing toward the outflow (downstream) side of the working fluid. That is, the incline 51a slopes down in a direction in which the working fluid flows. The incline 51a of the first brush seal 51 functions to prevent the working fluid from leaking.

When the rotor rotates and the blade 40 is thus rotated, the brush body 53 is pushed outwardly by the centrifugal force, and is stopped as the bottom crossbar 53b of the brush body 53 collides with the seal stop 54b of the seal bracket 54. In this way, the outward movement range of the brush body 53 is restricted. While the brush body 53 is pushed outwardly, the first brush seal 51 is inserted deeper into the blocking groove 30 so that the leakage of the working fluid at the clearance between the bottom of the blocking groove 30 and the outer end of the first brush seal 51 can be more reliably prevented.

An elastic body 59 may be disposed in the movement space 54a, and specifically between the seal stop 54b of the seal bracket 54 and the bottom crossbar 53b of the brush body 53. When the rotation of the rotor and the blade 40 is stopped, the elastic body 59 functions to return the brush body 53, which has been pushed outward, toward the tip of the blade 40 by exerting its restoring force on the bottom crossbar 53b of the brush body 53. That is, elastic body 59 biases the brush body 53 toward the blade 40.

FIG. 3 illustrates a first modification to the first embodiment of the tip sealing structure 10 for the blade 40. The tip sealing structure 10 may further include at least one first seal 60 and at least one second seal 70.

The first seal 60 may be disposed on the inner circumferential surface of the casing 200 adjacent to the blocking groove 30. According to the present invention, the first seal 60 may be configured as a honeycomb seal.

The second seal 70 may be disposed on the tip of the blade 70, in opposition to the first seal 60. According to the present invention, the second seal 70 may be configured as a labyrinth seal.

The first seal 60 and the second seal 70 are respectively provided at each side of the movable seal 50, namely, the upstream and downstream sides. With the presence of the first and second seals 70, the leakage of the working fluid can be more reliably suppressed.

FIG. 4 illustrates a second modification to the first embodiment of the tip sealing structure 10 for the blade 40, in which first seals 60 and second seals 70 are provided as in the first modification. In addition, according to the second modification, the first seal 60 may include protrusions 63 and a recess 61 formed between the protrusions 63.

The second seal 70 is disposed on the tip of the blade 40, particularly at a position corresponding to the recess 61.

As described above, according to the first and second modifications of the first embodiment, since the at least one first seal 60 and the at least one second seal 70 work in conjunction with the movable seal 50, it is possible to more reliably prevent the leakage of the working fluid at the tip of the blade 40. According to the second modification, in which the first seal 60 is provided with the recess 61 and the second seal 70 is disposed to face the recess 61 of the first seal 60, the leakage prevention effects can be further improved.

Second Embodiment

FIG. 5 illustrates the tip sealing structure 10 according to a second embodiment of the present invention. For the sake of convenience and to facilitate ready understanding, the following description of the second embodiment will omit discussion of components of the second embodiment having the same structure and function as in the first embodiment.

Referring to FIG. 5, the tip sealing structure 10' according to the second embodiment may include a casing 200', a blocking groove 30', and a movable seal 50'.

The blocking groove 30' may be formed in an inner circumferential surface of the casing 200', which may have a substantially cylindrical shape. Thus, the blocking groove 30' may be formed in the circumferential direction of the casing 20' to have a predetermined depth aligned with a perpendicular from the axis of the rotor 300.

The movable seal 50' is disposed at the tip of a blade 40 and is configured to move in the depth direction of the blocking groove 30' and to prevent leakage of the working fluid. With respect to the first embodiment, the movable seal 50' additionally includes at least one second brush seal 52.

The second brush seal 52 is disposed on a top surface (i.e., outer surface) of the seal stop 54b of the seal bracket 54. The second brush seal 52 is arranged parallel to the first brush seal 51 and is disposed at either side of the first brush seal 51.

The blocking groove 30' may be a stepped groove including a central groove 31 and at least one peripheral groove 33 disposed at either side of the central groove 31. The central groove 31 has an overall depth corresponding to the length of the first brush seal 51, that is, a depth accommodating the first brush seal 51 and its movement. The peripheral grooves 33 have a depth corresponding to the length of the second brush seal 52, that is, a depth accommodating the second brush seal 52 and its movement.

Since the blocking groove 30' has a stepped shape, the second brush seal 52 extending to a different height than the first brush seal 51 can be additionally provided. Since the first brush seal 51 and the at least one second seal 52 work in conjunction with each other, the sealing performance of the tip sealing structure for a blade can be further improved.

Here, the movable seal 50' may be additionally provided with a central brush seal 55 at the center of the first brush seal 51, wherein the central brush seal 55 extends to a greater height than the first brush seal 51 alone. The central brush seal 55 also functions to prevent the leakage of working fluid in the blocking groove 30'.

The tip sealing structure 10' according to the second embodiment of the present invention may further include one or both of the first and second modifications to the first embodiment.

Third Embodiment

FIG. 6 illustrates a tip sealing structure 10" according to a third embodiment of the present invention. For the sake of convenience and to facilitate ready understanding, the following description of the third embodiment will omit discussion of components of the third embodiment having the same structure and function as in the first and second embodiments.

As illustrated in FIG. 6, the tip sealing structure 10" for the third embodiment includes the casing 200', the blocking groove 30', and a movable seal 50".

The movable seal 50" is disposed at the tip of the blade 40 and is configured to move in the depth direction of the blocking groove 30' and to prevent leakage of the working fluid. In contrast to the first and second embodiments, the movable seal 50" includes a sealing beam 57 rather than the first brush seal 51.

The sealing beam 57 may be mounted on the top surface of the brush body 53, i.e., in the above-described central recess, and extends in the radial direction of the rotor disk. Thus, the sealing beam 57 is installed to be disposed in the blocking groove 30' when the movable seal 50" is moved in the depth direction of the blocking groove 30'. The sealing beam 57 may be made of a metal.

A roof beam 58 may be provided at the distal end of the sealing beam 57 to be received by the blocking groove 30'. As illustrated in FIG. 6, the roof beam 58 has a rectangular cross-section but is not limited thereto. For example, the roof beam 58 may have a triangular cross-section as illustrated in FIG. 7 or a semicircular cross-section as illustrated in FIG. 8. The triangular cross-section of the modification according to FIG. 7 includes an inclined surface that slopes down in a direction in which the working fluid flows.

Since the outer end of the sealing beam 57 is provided with the roof beam 58, the flow of working fluid in the block groove 30' is obstructed. Therefore, the leakage of the working fluid is reduced. That is, the sealing performance can be improved.

When the rotor rotates and the blade 40 accordingly rotates, the brush body 53 is pushed outwardly by the centrifugal force and is then stopped because the bottom crossbar 53*b* of the brush body 53 collides with the seal stop 54*b* of the seal bracket 54. In this way, the outward movement range of the brush body 53 is restricted. At this time, the sealing beam 57 is inserted deeper into the blocking groove 30', which has an effect of preventing the leakage of working fluid through a clearance between the bottom of the blocking groove 30' and the tip of the sealing beam 57.

As in the case of the second embodiment, the tip sealing structure 10" according to the third embodiment of the present invention may further include one or both of the first and second modifications to the first embodiment.

The present invention also provides a rotor that includes: a bucket including the blade 40 provided with the tip sealing structure 40 according to any one of the first to third embodiments; and a rotor disk having an outer circumferential surface on which the bucket is mounted.

The present invention also provides a gas turbine including a casing 200 and the rotor disposed inside the casing 200.

The details described above are only for provision of illustrative embodiments of a tip sealing stricture for a blade.

Therefore, it should be understood by those skilled in the art that various changes in form and details may be made therein without departing from the spirit and scope of the present invention as defined by the following claims.

What is claimed is:

1. A tip sealing structure for a blade, the tip sealing structure comprising:
   a casing having an inner circumferential surface facing the blade;
   a blocking groove formed in the inner circumferential surface of the casing;
   a first seal mounted on the inner circumferential surface of the casing and disposed adjacent to the blocking groove;
   a second seal mounted on a tip of the blade to face the first seal; and
   a movable seal provided on the tip of the blade and configured to move in a depth direction of the blocking groove,
   wherein the movable seal comprises:
      a seal bracket disposed on the tip of the blade, the seal bracket enclosing a movement space that is open at one end and including a seal stop formed at the open end of the movement space; and
      a brush body including a bottom crossbar and an upright extending from the bottom crossbar, the brush body disposed partially within the seal bracket and configured such that movement of the moveable seal is limited by the bottom crossbar being stopped by the seal stop of the seal bracket when the movable seal moves in the depth direction of the blocking groove.

2. The tip sealing structure according to claim 1, wherein the moveable seal further comprises an elastic body disposed inside the movement space to bias the brush body toward the blade.

3. The tip sealing structure according to claim 1,
   wherein the brush body further includes a top crossbar, and
   wherein the upright extends between the top and bottom crossbars.

4. The tip sealing structure according to claim 1, wherein the first seal includes protrusions and a recess formed between the protrusions, and the second seal is disposed to face the recess of the first seal.

5. The tip sealing structure according to claim 1, wherein the moveable seal further comprises a first brush seal mounted on the brush body and positioned in the blocking groove.

6. The tip sealing structure according to claim 5, wherein the first brush seal has a distal end disposed in the blocking groove, the distal end having an incline that slopes down in a direction in which the working fluid flows.

7. A rotor comprising:
   a rotor disk having an outer circumferential surface; and
   a bucket including a blade provided with the tip sealing structure according to claim 1.

8. A gas turbine comprising:
   an outer shell formed of the casing; and
   the rotor according to 7, disposed in the casing.

9. A tip sealing structure for a blade, the tip sealing structure comprising:
   a casing having an inner circumferential surface facing the blade;
   a blocking groove formed in the inner circumferential surface of the casing;

a first seal mounted on the inner circumferential surface of the casing and disposed adjacent to the blocking groove;
a second seal mounted on a tip of the blade to face the first seal; and
a movable seal provided on the tip of the blade and configured to move in a depth direction of the blocking groove;
wherein the first seal includes protrusions and a recess formed between the protrusions, and the second seal is disposed to face the recess of the first seal.

10. A tip sealing structure for a blade, the tip sealing structure comprising:
a casing having an inner circumferential surface facing the blade;
a blocking groove formed in the inner circumferential surface of the casing; and
a movable seal provided on a tip of the blade and configured to move in a depth direction of the blocking groove, the movable seal comprising:
a seal bracket disposed on the tip of the blade, the seal bracket enclosing a movement space that is open at one end and including a seal stop formed at the open end of the movement space;
a brush body including a bottom crossbar and an upright extending from the bottom crossbar, the brush body disposed partially within the seal bracket and configured such that movement of the moveable seal is limited by the bottom crossbar being stopped by the seal stop of the seal bracket when the movable seal moves in the depth direction of the blocking groove; and
a first brush seal mounted on the brush body and positioned in the blocking groove, the first brush seal having a distal end disposed in the blocking groove, the distal end having an incline that slopes down in a direction in which the working fluid flows.

11. The tip sealing structure according to claim 10, wherein the moveable seal further comprises an elastic body disposed inside the movement space to bias the brush body toward the blade.

12. The tip sealing structure according to claim 10, wherein the brush body further includes a top crossbar, and
wherein the upright extends between the top and bottom crossbars.

13. The tip sealing structure according to claim 10, further comprising:
a first seal mounted on the inner circumferential surface of the casing and disposed near the blocking groove; and
a second seal mounted on the tip of the blade to face the first seal.

14. The tip sealing structure according to claim 13, wherein the first seal includes protrusions and a recess formed between the protrusions, and the second seal is disposed to face the recess of the first seal.

15. A rotor comprising:
a rotor disk having an outer circumferential surface; and
a bucket including a blade provided with the tip sealing structure according to claim 10.

16. A gas turbine comprising:
an outer shell formed of the casing; and
the rotor according to 15, disposed in the casing.

* * * * *